US008635601B2

(12) United States Patent
Gozzi

(10) Patent No.: US 8,635,601 B2
(45) Date of Patent: Jan. 21, 2014

(54) METHOD OF CALCULATING KEY PERFORMANCE INDICATORS IN A MANUFACTURING EXECUTION SYSTEM

(75) Inventor: Andrea Gozzi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 1034 days.

(21) Appl. No.: 12/254,285

(22) Filed: Oct. 20, 2008

(65) Prior Publication Data

US 2009/0105981 A1   Apr. 23, 2009

(30) Foreign Application Priority Data

Oct. 19, 2007   (EP) ..................................... 07020462

(51) Int. Cl.
*G06F 9/44*   (2006.01)
(52) U.S. Cl.
USPC .......................................... 717/126; 717/106
(58) Field of Classification Search
None
See application file for complete search history.

(56) References Cited

U.S. PATENT DOCUMENTS

| 7,219,329 | B2 * | 5/2007 | Meijer et al. | 717/106 |
| 7,257,513 | B2 * | 8/2007 | Lilly | 702/182 |
| 7,424,470 | B2 * | 9/2008 | Pfeifer et al. | 1/1 |
| 7,665,062 | B1 * | 2/2010 | Bauer et al. | 717/108 |
| 7,711,670 | B2 * | 5/2010 | Roediger | 706/46 |
| 7,716,571 | B2 * | 5/2010 | Tien et al. | 715/212 |
| 8,140,383 | B2 * | 3/2012 | Busch | 705/7.38 |
| 8,209,360 | B2 * | 6/2012 | Tomaszewski | 707/803 |
| 8,290,806 | B2 * | 10/2012 | Lee et al. | 705/7.23 |
| 2003/0155415 | A1 * | 8/2003 | Markham et al. | 235/376 |
| 2004/0098358 | A1 * | 5/2004 | Roediger | 706/46 |
| 2004/0249867 | A1 * | 12/2004 | Kraiss et al. | 707/203 |
| 2004/0255268 | A1 * | 12/2004 | Meijer et al. | 717/106 |
| 2005/0049831 | A1 * | 3/2005 | Lilly | 702/182 |
| 2005/0216831 | A1 * | 9/2005 | Guzik et al. | 715/513 |
| 2005/0256896 | A1 * | 11/2005 | Pfeifer et al. | 707/102 |
| 2006/0010164 | A1 * | 1/2006 | Netz et al. | 707/104.1 |
| 2006/0112104 | A1 * | 5/2006 | An et al. | 707/10 |

(Continued)

FOREIGN PATENT DOCUMENTS

| EP | 1788517 A1 | 5/2007 |
| EP | 1819096 A1 | 8/2007 |
| WO | 2006124113 A2 | 11/2006 |

OTHER PUBLICATIONS

Simon Guest, "Using Reflection Emit to Cache .NET Assemblies", Feb. 2002, retrieved from <http://msdn.microsoft.com/en-us/library/ms973916(d=printer).aspx> total pages: 20.*

(Continued)

*Primary Examiner* — Don Wong
*Assistant Examiner* — Marina Lee
(74) *Attorney, Agent, or Firm* — Laurence A. Greenberg; Werner H. Stemer; Ralph E. Locher

(57) ABSTRACT

Key performance indicators, herein after referred as KPIs, are calculated within a manufacturing execution system. The calculation is performed by defining a custom KPI set at engineering time. In the case that the custom KPI definition is valid, a function code for calculating each custom KPI belonging to the custom KPI set is, automatically generated, through a software framework with support for code generation, at engineering time. At a runtime, a calculation is requested of a given custom KPI belonging to the custom KPI set. In the case that the calculation request is valid, at runtime, the calculation function code of the given custom KPI is executed.

4 Claims, 3 Drawing Sheets

(56) References Cited

U.S. PATENT DOCUMENTS

| | | | |
|---|---|---|---|
| 2006/0159017 A1* | 7/2006 | Mun et al. | 370/230 |
| 2006/0262922 A1 | 11/2006 | Margulies et al. | |
| 2007/0050237 A1* | 3/2007 | Tien et al. | 705/11 |
| 2007/0118419 A1 | 5/2007 | Maga et al. | |
| 2007/0143161 A1 | 6/2007 | Tien et al. | |
| 2007/0185746 A1* | 8/2007 | Chieu et al. | 705/7 |
| 2008/0196002 A1* | 8/2008 | Koster | 717/106 |
| 2009/0105981 A1* | 4/2009 | Gozzi | 702/81 |
| 2009/0157447 A1* | 6/2009 | Busch | 705/7 |
| 2010/0249978 A1* | 9/2010 | Solimano et al. | 700/111 |

OTHER PUBLICATIONS

"Siemens SIMATIC® IT Production Suite 6.1 Release Notes" 2005, retrieved from <http://cache.automation.siemens.com/dnl/jA2NTA1NwAA__22058823__Akt/ReadMe_ProductionSuite.pdf> pp. 96.*

"SIMATIC"—Simatic WinCC, Process Visualization using Plant Intelligence, published by Siemens AG, Nuernberg, Germany in 2006—XP-002477281.

* cited by examiner

METHOD OF CALCULATING KEY PERFORMANCE INDICATORS IN A MANUFACTURING EXECUTION SYSTEM

CROSS-REFERENCE TO RELATED APPLICATION

This application claims the priority, under 35 U.S.C. §119, of European application EP 07020462.3, filed Oct. 19, 2007; the prior application is herewith incorporated by reference in its entirety.

BACKGROUND OF THE INVENTION

Field of the Invention

The present invention relates to a method and to a system for calculating key performance indicators in a manufacturing executing system.

In the world of industrial automation of today, manufacturing companies, in order to improve their production capabilities, make use of IT infrastructures for industrial control and automation.

With time, such software products for industrial automation have increased in scope and refinement in order to fit the large variety of requirements of manufacturing companies.

As defined by the Manufacturing Enterprise Solutions Association (MESA International), a manufacturing execution system (MES) "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

In other words, the MES system is a set of software applications that are used in order to control a manufacturing plant.

The functions that MES systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES products, under its SIMATIC product family.

In manufacturing plants, a variety of configurations enable the implementation of flexible machine concepts which require rather complicated and sophisticated software solutions in order to enable the approach of integrated automation.

As used herein, a software application is a set of software components developed by software developers to perform some useful actions within a MES, e.g. monitoring values coming from plant process or controlling a plant device.

Typically, at engineering time, system engineers flexibly customize MES applications according to the specific manufacturing plant requirements.

Instead, at runtime, MES applications are utilized by end-users who may be plant operators or line responsible personnel.

An important feature for MES applications in manufacturing control and automation is the calculation of key performance indicators (KPIs).

KPIs are metrics computed to quantify certain performances for a planned or an executed manufacturing production.

For example, a KPI may be the production rate of a given plant or of a give machine computed as the number of manufactured pieces in the time interval. Another example may be the idle time of certain plant machines in a production day.

Since different manufacturing plants may require different kinds of KPIs to be calculated, prior art MES software applications provide features for custom definition of KPIs according to the specific plant requirements.

In view of this, system engineers, knowing the specific requirements of a given manufacturing plant, are able to define custom KPIs, at engineering time, by using editing tools provided by the MES system.

FIG. 1A shows a schematic flow-chart illustrating an example of KPI definition steps, at engineering time, in prior art MES systems.

At engineering time, at step 101, a system engineer defines a custom set of KPIs based on the grammar of the specific editing tool language. The engineer usually defines each new custom KPI by specifying the KPI name (e.g. MyKPI), the used variables (e.g. V1, V2) and the computation formula (e.g. (V1+V2)/2).

At step 102, the custom KPI definition is validated. For example, the KPI definition may not be valid (N) if the used variables V1, V2 are unknown or if the grammar of the formula is not correct. In such cases, the KPI definition is rejected in step 102*n*.

In case the custom KPI definition is valid (Y), in step 103, an evaluation graph MyKPIGraph is generated to structurally represent the KPI formula of the example (V1+V2)/2.

FIG. 1B shows a schematic flow-chart illustrating an example of KPI computation steps, at runtime, in a prior art MES.

At step 111, at runtime, the computation of a given KPI is requested by specifying the KPI name and the variable values, e.g. KPI: MyKPI, V1=48, V2=52.

At step 112, the custom KPI computation request is validated. For example, the KPI computation request may not be valid (N) if the variable values are not valid. In such cases, the KPI computation request is rejected in step 112*n*.

In case the request is valid (Y), in step 113, a generic graph evaluator is invoked for calculating the specific KPI MyKPI, e.g. EvaluateKPIGraph (MyKPIGraph, [V1=48,V2=52]).

At step 114, the KPI evaluator assigns values to the formula variables, e.g. by entering the pairs of variable and related value [(V1, 48),(V2, 52)] in the argument list of the KPI evaluator.

For each KPI to be computed, as illustrated in steps 115 to 117, the KPI evaluator analyzes the graph representing the formula and applies the operators defined within the formula to the actual available data values in order to perform the KPI computation and arriving to the final result, e.g. 50 of step 117. The KPI evaluator evaluates the specific MyKPI graph in recursive and hierarchic manner departing from the lower sub-trees.

The graph computation is a highly consuming technique in term of computing resources.

The computational complexity is due to the fact that the generic KPI evaluator, when invoked, has to interpret and understand the specific custom formulas as shown in the example above.

A second reason for the complexity is the fact that the generic KPI evaluator has to perform a number of validation checks of the formula and variables every time it computes every sub-tree of the custom KPI.

Moreover, the evaluation graph complexity may increase dramatically when logical conditions, e.g. IF, THEN, ELSE, or comparison operators, e.g. Max[ . . . ], Min[ . . . ], are included in the formula.

Additionally, the computation of common KPIs usually involves a large amount of data.

Thus, unfortunately, for the above reasons, i.e. the complexities of custom formulas computed through graphs and the high volume of data, the custom KPI computation results to be a software intensive task which leads to tough performance issues.

SUMMARY OF THE INVENTION

It is accordingly an object of the invention to provide a method of calculating key performance indicators in a manufacturing execution system which overcome the above-mentioned disadvantages of the prior art methods and devices of this general type, that minimizes the computational efforts at runtime while allowing customization at engineering time.

The aforementioned aim is achieved by a method and a system for calculating key performance indicators, herein after referred as KPIs, within a manufacturing execution system. The method includes defining a custom KPI set at engineering time. In the case that the custom KPI definition is valid, there is the automatic generation, through a software framework with support for code generation, of a function code for calculating each custom KPI belonging to the custom KPI set, at engineering time. At runtime, a calculation of a given custom KPI belonging to the custom KPI set is requested. In the case that the calculation request is valid, at runtime, the calculation function code of the given custom KPI is executed.

In the invention, the software framework may preferably be a MICROSOFT.NET® framework or a JAVA® framework.

The proposed invention allows the calculation of custom defined KPIs with reduced computational efforts.

Moreover, embodiments of the proposed invention allow, at engineering time, to define complex formulas for custom KPIs while limiting the software developer efforts. For example, operator comparisons and composition of other KPIs can be easily included in custom KPI definitions.

Embodiments of the present invention allow effective validation of the custom defined KPIs with a rich compiler reporting that helps the system engineer in checking the formula and looking for errors while limiting the software developer efforts.

Embodiments of the present invention allow easy bug-proof implementation of custom constraint computation while limiting the software developer efforts. In fact, once the custom KPI code has been generated at engineering time, the application can rely on the reliability of the code compiler.

The invention requires a limited number of validation steps at runtime.

Other features which are considered as characteristic for the invention are set forth in the appended claims.

Although the invention is illustrated and described herein as embodied in calculating key performance indicators in a manufacturing execution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
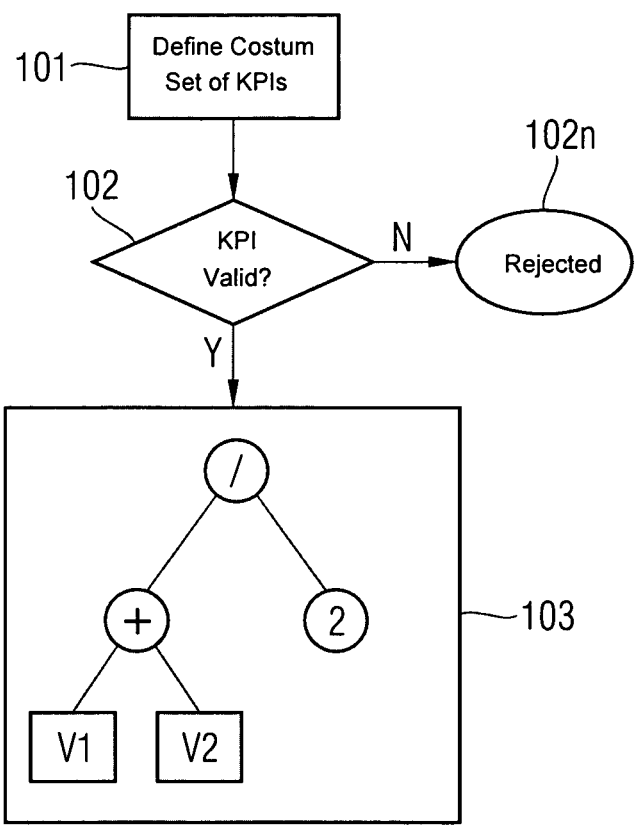
FIG. 1A is a flow-chart schematically illustrating an example of KPI definition steps, at engineering time, in typical prior art manufacturing execution systems (MES)
Figure 1B:
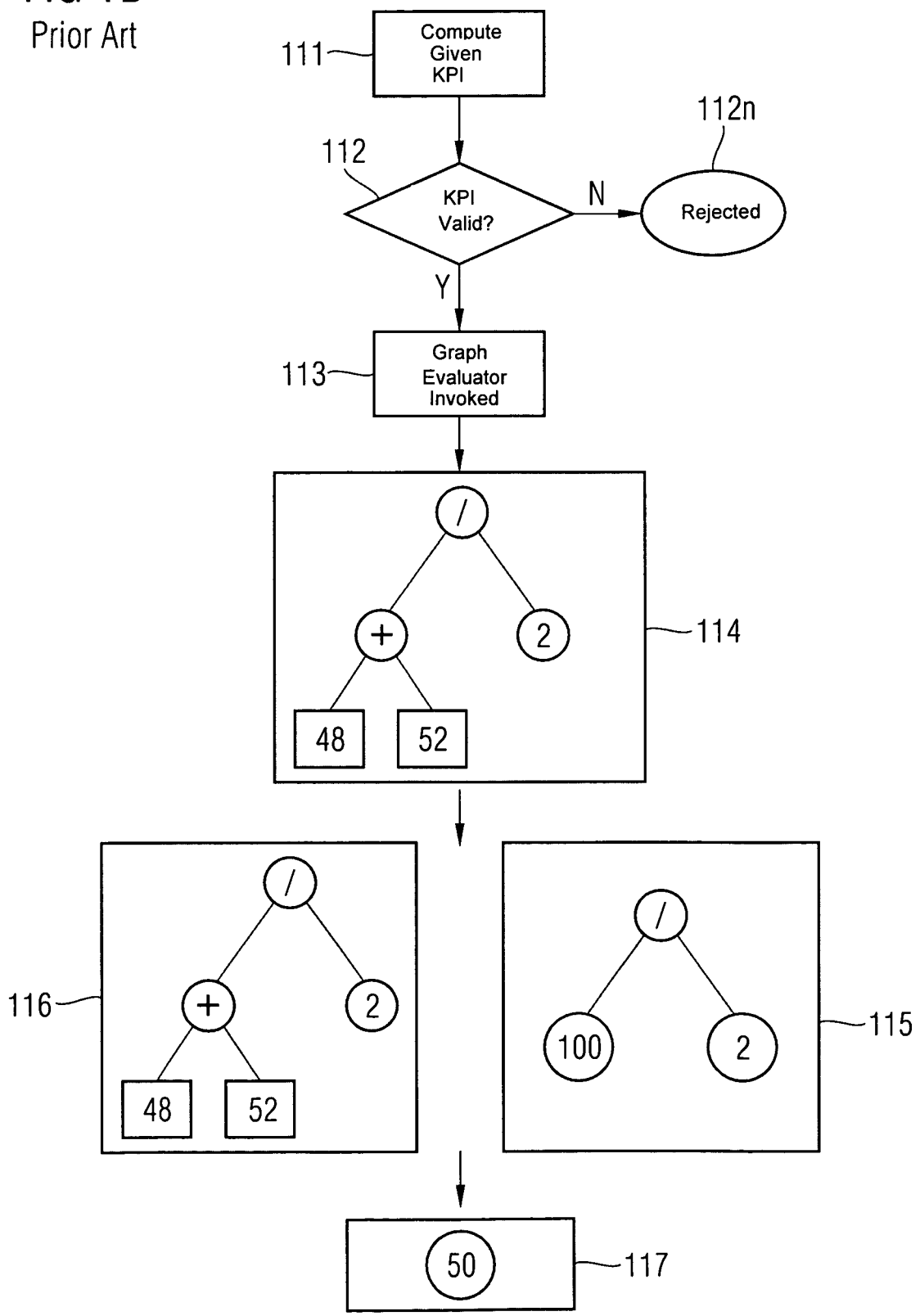
FIG. 1B is a flow-chart schematically illustrating an example of KPI computation steps, at runtime, in typical prior art manufacturing execution systems.
Figure 2A:
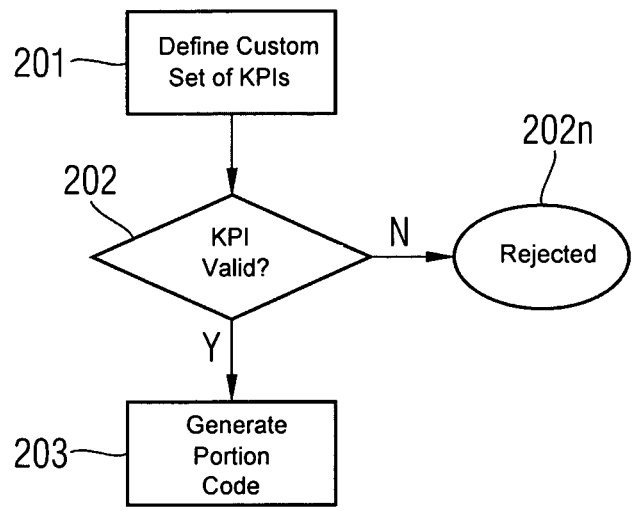
FIG. 2A is a flow-chart schematically illustrating an example of KPI definition steps, at engineering time, in an example embodiment according to the invention.

Referring now to the figures of the drawing in detail and first, particularly, to FIG. 2A thereof, there is shown a schematic flow-chart illustrating an example of KPI definition steps, at engineering time, in an example embodiment according to the present invention.

At engineering time, at step 201, a system engineer defines a custom set of KPIs based on the grammar of a specific definition language or a graphical editing tool.

The engineer may define each new custom KPI by specifying the KPI name (e.g. MyKPI), the used variables (e.g. V1,V2) and the computation formula (e.g. (V1+V2)/2).

At step 202, the custom KPI definition is validated. In case the custom KPI definition is not valid (N), it is rejected in step 202*n*.

In case the custom KPI definition is valid (Y), in step 203, a portion of code is automatically generated, by a framework with support for code generation, in accordance with the custom defined formula. In this context, from the MES point of view, the MES itself is at engineering time while from the custom KPI application module point of view, the module itself is at runtime.

The custom formula is translated in programming code by the framework and it is checked by the compiler. The compiler report provides to the system engineer the information for seeking possible syntax and semantic errors in the custom defined KPI formula.

For example, for a custom defined KPI formula (V1+V2)/2, the following function code portion may be generated:

```
float MyKPIFunc (float V1, float V2)
{
return (V1+V2)/2;
}
```

In embodiments of the present invention, the programming languages or frameworks with support for code generation may be runtime compiled programming framework such as MICROSOFT.NET® or JAVA® which include code reflection and emission features.

Once the programming framework has generated the new custom function code, it names the new module/procedure and links it to the custom defined KPI and stores it within the application so as to be used at runtime.

Figure 2B:
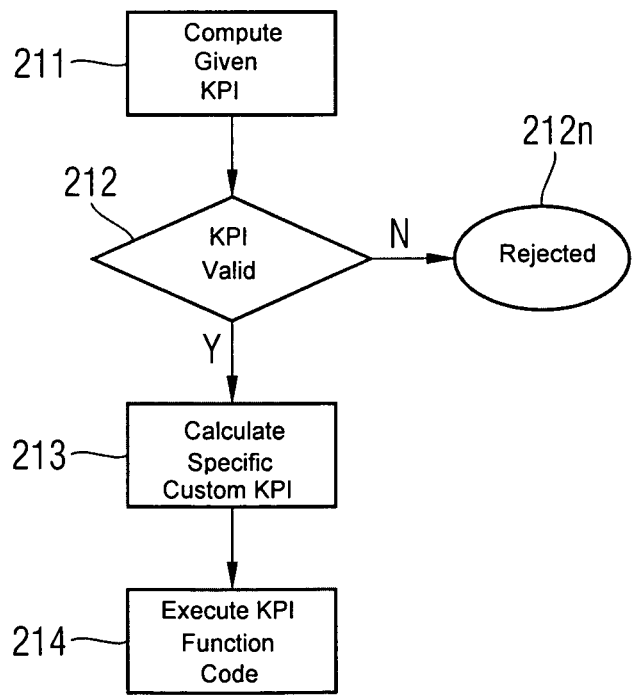
FIG. 2B is a flow-chart schematically illustrating an example of KPI computation steps, at runtime, in an example embodiment according to the invention.

FIG. 2B shows a schematic flow-chart illustrating an example of KPI computation steps, at runtime, in an example embodiment according to the present invention.

At step 211, at runtime, the computation of a given KPI is requested by specifying the custom KPI name and the variable values, e.g. KPI: MyKPI, V1=48, V2=52. In embodiments of the present invention, the custom KPI computation request may be requested manually by the end-user or automatically by the system.

At step 212, the custom KPI computation request is validated. In case the KPI computation request is not valid (N), it is rejected in step 212*n*.

In case the request is valid (Y), in step 213, the specific previously generated procedure of the custom KPI is invoked for calculating the specific custom KPI.

For the above example, the specific KPI function is invoked as follows:

```
float KPIresult=MyKPIfunc(48, 52);
```

At step 214, the calculation of the specific custom KPI is performed by executing the specific KPI function code with the invoked set of input data.

Advantageously, the custom KPI computation implies the efficient execution of a single code snippet which is already coded in the software system since it was previously generated at engineering time.

The invention claimed is:

1. A method for calculating key performance indicators (KPI) within a manufacturing execution system, which comprises the steps of:

defining a custom KPI set at engineering time based on grammar of a graphical editing tool;

determining if the custom KPI set is valid, and if valid performing the following steps:

automatically generating at the engineering time, through a software framework with support for code generation, a function code for calculating each custom KPI belonging to the custom KPI set, the function code being generated just once for each said custom KPI resulting in a calculation function code, the calculation function code being compiled and compatible with runtime coding software and is runtime compiled programming;

storing the calculation function code and the custom KPI;

requesting, at runtime, a calculation of a given custom KPI belonging to the custom KPI set; and determining if a calculation request is valid, and if valid, at runtime, executing a calculation function code of the given custom KPI.

2. The method according to claim 1, wherein the software framework with support for code generation is a runtime compiled framework including code reflection and emission features.

3. The method according to claim 1, wherein the calculation function code does not graphically reproduce the given custom KPI at runtime.

4. A system, comprising:

a processor programmed to:

define a custom KPI set at engineering time based on grammar of a graphical editing tool;

determine if the custom KPI set is valid, and if valid performing the following steps:

automatically generate at the engineering time, through a software framework with support for code generation, a function code for calculating each custom KPI belonging to the custom KPI set, the function code being generated just once for each said custom KPI resulting in a calculation function code, the calculation function code being compiled and compatible with runtime coding software and is runtime compiled programming;

store the calculation function code and the custom KPI;

request, at runtime, a calculation of a given custom KPI belonging to the custom KPI set; and determine if a calculation request is valid, and if valid, at runtime, executing the calculation function code of the given custom KPI.

\* \* \* \* \*